United States Patent

Mabuchi et al.

[11] 4,311,952
[45] Jan. 19, 1982

[54] BATTERY CHARGING SYSTEM

[75] Inventors: Kenichi Mabuchi; Kogiro Komatsu, both of Tokyo, Japan

[73] Assignee: Mabuchi Motor Co. Ltd., Tokyo, Japan

[21] Appl. No.: 669,240

[22] Filed: Mar. 22, 1976

Related U.S. Application Data

[63] Continuation-in-part of Ser. No. 518,469, Oct. 29, 1974, abandoned.

[30] Foreign Application Priority Data

Nov. 2, 1973 [JP] Japan .................. 48-123866

[51] Int. Cl.³ ................................. H02J 7/10
[52] U.S. Cl. .......................... 320/3; 320/39; 320/51; 320/57; 323/906
[58] Field of Search ............... 320/2, 3, 4, 59, 51, 320/57, 18, 39, 40, 43, 15

[56] References Cited

U.S. PATENT DOCUMENTS

| | | | |
|---|---|---|---|
| 979,155 | 12/1910 | Gugler | 320/3 |
| 3,086,160 | 4/1963 | Loftus | 320/51 X |
| 3,148,322 | 9/1964 | Booe et al. | 320/43 |
| 3,393,355 | 7/1968 | Whoriskey et al. | 320/18 |
| 3,484,659 | 12/1969 | Nagai et al. | 320/2 X |
| 3,825,740 | 7/1974 | Friedman et al. | 320/3 X |

FOREIGN PATENT DOCUMENTS

| | | | |
|---|---|---|---|
| 1212533 | 10/1959 | France | 320/2 |
| 604094 | 6/1948 | United Kingdom | 323/15 |

OTHER PUBLICATIONS

Jakobi, "Alkaline Secondary Cells", Encyclopedia of Chem. Technology, vol. 3, 2nd Ed., 1963, John Wiley & Sons.

Primary Examiner—Robert J. Hickey

[57] ABSTRACT

A battery charging system designed to charge a battery, especially a nickel-cadmium (Ni-Cd) battery from a lead acid power supply without overcharging, and to charge uniformly a plurality of batteries in parallel. A non-linear resistance is utilized and is matched to the voltage difference of the power supply battery and the batteries being charged.

7 Claims, 7 Drawing Figures

BATTERY CHARGING SYSTEM

BACKGROUND OF THE INVENTION

This is a continuation-in-part application of Ser. No. 518,469 filed on 10/29/74 by the present inventor and now abandoned.

1. Field of the Invention

This invention generally relates to a battery charging system, and more specifically to a constant voltage battery charging system designed to charge one or more batteries of the Ni-Cd type to a desired voltage without overcharging by using a non-linear resistance element which is turned off at under a voltage equal to the voltage difference between the terminal voltage of a power supply battery of the lead-acid type, and the charging completion voltage of a battery to be charged, and to equally charge a plurality of batteries in parallel.

2. Description of the Invention

The development of Ni-Cd batteries has recently experienced a remarkable progress, and they are now widely used as power supply batteries for electrically-operated toys because of their small internal resistance and rapid chargeability. In charging batteries such as Ni-Cd batteries to a desired charging completion voltage, the conventional method to detect the charging completion is to monitor a voltage detecting means. However, this requires reliable confirmation of the charging completion by continuously monitoring such a detecting means, otherwise the batteries to be charged would be overcharged, resulting in extreme overheat of the batteries.

Overcharging is generally brought about in the following manner. As charging of the batteries is first carried out under a relatively large charging current there is first attained a charging completion condition in the local area within the element cell being charged adjacent to the contacts receiving the current. Under this condition, the terminal voltage of the cell at the point of contact would show a charging completion voltage. However, in fact, the entire cell has not received total charge completion voltage, only the local area has. If charging current were to be cut off upon the detection of the charging completion voltage across the immediate terminals, the terminal voltage would gradually decrease. This would occur because the condition of charging completion in the local area would be dispersed toward the other areas of the cell where the condition of charging completion has not yet been attained. In other words, although the local area will have received a condition of charging completion, the rest of the cell has not yet achieved charging completion throughout the entire cell.

If, on the other hand, in spite of the local area exhibiting a condition of charging completion, should further charging be continued, there would lead a condition of overcharging in the local area, although the rest of the area of the cell has not attained completion of charging. Under such circumstances, an undesired gas would be produced from the local area because of this overcharging.

Additionally, when a plurality of batteries of this type having small internal resistance are used in series as the power supply of electric-powered toys, it is desired that the electric charge in the batteries be uniformly diminished. To avoid the so-called reverse charging caused by unequalized discharging, it is necessary to discharge the batteries in parallel prior to charging, or to charge the batteries so that the charged quantity of each battery becomes equal.

This invention is intended to solve the above-mentioned problems, and is designed to prevent overcharging and to equalize the charged quantity in a plurality of batteries which are charged in parallel.

There are generally two types of charging systems. One is a constant current charging system which utilizes a very low value of charging current, typically approximately one hundred milliamps. To charge the batteries take a relatively long period of time, typically sixteen hours. In such constant current charging systems, if charging of the batteries were to continue for more than the required number of hours, the current would still be controlled throughout the charging and no overcharging of a local area would occur. The only result of the continued charging would be that the voltage across each of the individual batteries would be uniformly higher than their rated voltage. However, this would be a uniform overvoltage, not a localized current overcharging.

On the other hand, the present invention is concerned with a constant voltage charging circuit. Thus, while the current may vary, the voltage will remain at the desired voltage level, regardless of the amount of time that the charging is continued. In this type of charging system, overcharging of a local area does result. However, even though there may be excessive current during the course of the charging cycle, after continued charging the whole of the battery cell would come to a uniformly charged voltage at the desired final voltage value.

When charging nickle cadmium type batteries using a lead-acid power supply battery, an additional problem results. Both the nickle cadmium battery and the lead-acid battery include individual cells each of which have predetermined voltage levels. Typically, each nickle cadmium cell has a value of 1.7 V and each lead-acid battery cell has a voltage level of 2.0 V. If it were possible to optionally select the value of the voltage of the power source at any particular desired value, then overcharging could be avoided by utilizing the floating charging system as is known in the art. However, when using the lead acid battery with the predetermined voltage level cells it is not possible to avoid overcharging in this manner. This is especially so when the number of elemental cells in the power supply battery is equal to the number of elemental cells in the nickel-cadmium battery being charged and the resulting voltage disparity is great.

SUMMARY OF THE INVENTION

It is therefore an object of the present invention to provide a constant voltage battery charging system capable of charging Ni-Cd batteries without overcharging. It is another object of the present invention to provide a battery charging system capable of charging equally a plurality of Ni-Cd batteries even when those batteries which are charged in parallel are left in the charging state. Furthermore, using the constant voltage charging system a charge can be completed with 2 Ampers charging current, for example in about 10 minutes or less.

DETAILED DESCRIPTION OF THE EMBODIMENT

Figure 1A:
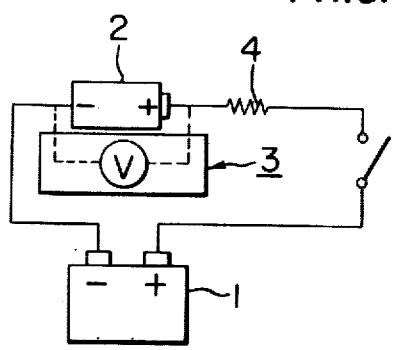
FIGS. 1(A), (B) and (C) are a block diagram and graphs of the conventional battery charging system.
Figure 2A:
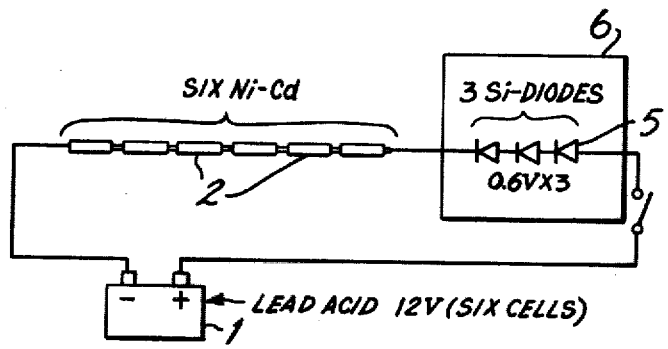
FIGS. 2(A), (B) and (C) are the block diagram and graphs of a circuit embodying this invention.
Figure 3:
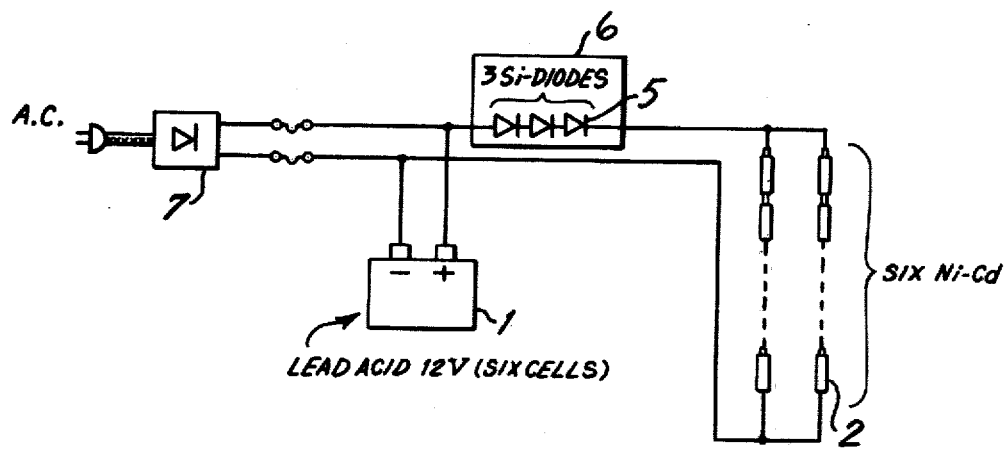
FIG. 3 is the block diagram of another circuit embodying the present invention.

FIGS. 1(A), (B) and (C) are the block diagram and graphs of the conventional battery charging system. FIGS. 2(A), (B) and (C) are the block diagram and graphs of a circuit embodying the present invention. All these figures represent the case where each cell of a Ni-Cd battery is charged from the initial stage of charging of 1.2 V to the charging completion voltage of 1.7 V by means of a lead-acid battery having a number of individual cells whose terminal voltage is 2.0 V. Graphs indicate changes in the line current, the terminal voltage and temperature of a battery to be charged. FIG. 3 is the block diagram of another circuit embodying the present invention in which the equalized charging of a plurality of batteries is accomplished using the A-C power source.

In the figures, the numeral 1 refers to a power supply battery, for example, a lead-acid battery, whose capacity is larger than the charging completion voltage of a battery to be charged. The numeral 2 refers to a battery to be charged, or a Ni-Cd battery, 3 to a means to detect the charging voltage, 4 to a current controlling resistance of the conventional type, 5 to a non-linear resistance element used in the present invention, for example silicon or germanium diodes, 6 to a circuit portion embodying the present invention, and 7 to a constant voltage D-C power supply.

Figure 1B:
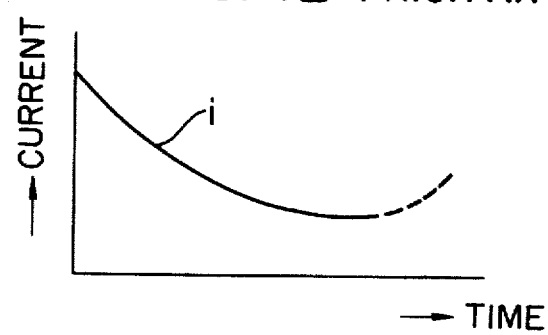
Figure 1C:
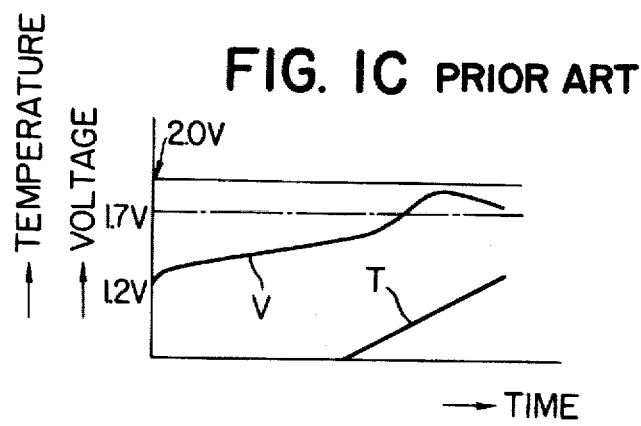

FIGS. 1(B) and (C) are based on the assumption that when the battery 2 having individual cells whose terminal voltage at the initial stage of charging is 1.2 V, is gradually charged from the power source of a lead-acid battery 1, having individual cells whose terminal voltage is 2.0 V, via a current controlling resistance 4 and the terminal voltage of the individual cells of the battery 2 reaches 1.7 V, the completion of charging of the battery 2 is detected by a charging voltage detecting means 3. In this case, however, if the charging is continued from carelessness, the battery 2 will be overcharged and the charging current will be continuously supplied, as clearly seen from FIG. 1(C). Then, the terminal voltage will begin to drop as the battery 2 is heated, the charging current will be further increased, and the battery 2 will be extremely overheated.

FIGS. 2(A), (B) and (C) show an embodiment of the present invention in which there are provided the same number of elemental cells of the nickel-cadmium battery as there are elemental cells in the charging lead-acid battery. The charging current in this case is made several Ampers in the initial stage of charging. Instead of the linear resistance 4 which has heretofore been utilized in prior art devices, there are included a series of diodes 5. Three silicon diodes are shown, however, these could be replaced by six germanium diodes. Additionally, combinations of silicon diodes and germanium diodes can also be utilized. The diodes prevent overcharging and overheatng of the battery 2. In this embodiment, the voltage difference between the lead-acid battery and the batteries being charged is shown by the following equation:

$$(2.0\ V \times 6) - (1.7\ V \times 6) = 1.8\ V$$

Figure 2B:
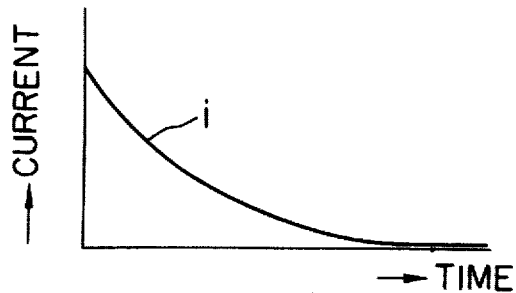
Figure 2C:
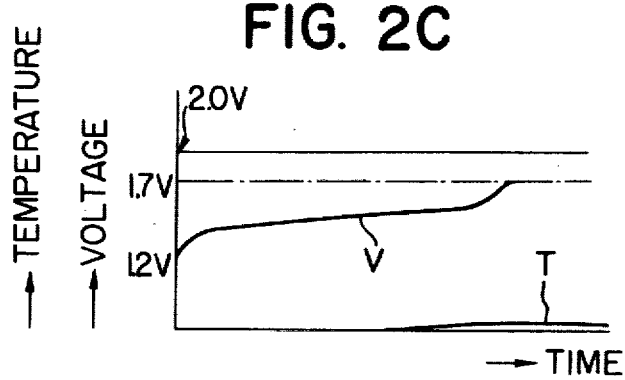
Figure 3:
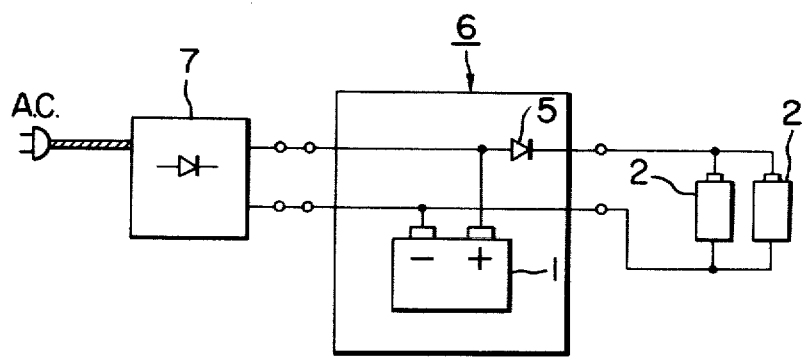

Each of the diodes 5 has a forward threshold voltage of approximately 0.6 V. Utilizing three such diodes, the battery 2 is held at the desired output voltage of 1.7 V across each elemental cell. Consequently, changes in the terminal voltage and temperature of the battery 2 assume curves as shown in FIG. 2(C), with the consequence that the battery 2 is neither overcharged nor subject to extreme overheat.

In the prior art circuit shown in FIG. 1(A), the value of the resistance is modified to accommodate the various voltage levels of the batteries. The purpose of the resistor is to maintain a constant current charging of the battery and prevent overcharging. However, using the circuit shown in FIG. 1(A) will result in overheating of the battery. By utilizing the diodes as shown in FIG. 2(A), and matching the value of the diodes to the values of the batteries, the voltage level of the nickle-cadmium battery can be maintained at the desired level and overheating is avoided.

Although not shown, a constant resistance value could be included in the circuit shown of FIG. 2(A) as a safety feature to prevent a sudden surge of current and prevent extremely large currents from flowing. However, such resistor is not matched to the voltages of the batteries but is only for a safety feature.

FIG. 3 shows another embodiment of the present invention in which two or more Ni-Cd batteries are charged in parallel from the A-C power source. In the figure, the numeral 7 refers to a constant voltage D-C power supply which is used for charging batteries in the floating condition keeping the terminal voltage of the power supply battery, or lead-acid battery 1 at a predetermined value. In this embodiment, the terminal voltage of each cell of the lead-acid battery 1 is maintained at 2.0 V, and the forward threshold voltage of the non-linear resistance element, is 0.6 V for a silicon diode or 0.3 V for a germanium diode 5. Two germanium diodes could be used in place of each silicon diode.

In this embodiment, a plurality of batteries are equally charged by means of the lead-acid battery 1 and the germanium diode 5. However, the charging of batteries 2 does start with different residual charges for each battery, and therefore, the time required for each battery to complete the charging to the charging completion voltage of 1.7 V for each cell (equal to 2.0 V–0.3 V) is not necessarily equal.

Therefore, at the point of time when the voltage of a battery (hereinafter referred to as the battery A) of the batteries 2 first reaches 1.7 V for each cell, other batteries may not have reached 1.7 V. However, thenceforth the charging current from the lead-acid battery 1 is no longer supplied to the battery A since the threshold voltage of the diodes 5 is 0.3 V. Thus, overcharging of each cell of the battery A to over 1.7 V can be avoided. In the meantime, other batteries are supplied with the charging current by the battery A which has each cell already reached 1.7 V. And, once all the cells of the batteries 2 reach 1.7 V, they are no longer overcharged to over 1.7 V as described in connection with FIG. 2.

In the embodiment shown in FIG. 3, the lead-acid battery has six individual cells providing a total of 12 volts and each of the nickle-cadmium batteries 2 contain six elemental cells with a terminal voltage of 1.7 V each. In this case, to match the voltage between the source and the batteries, three silicon diodes could be used or six germanium diodes could be used, or combinations combining the two types.

In other words, when one or more batteries such as Ni-Cd batteries are charged from the power supply battery having larger terminal voltage than the charging completion voltage of the batteries to be charged, the present invention makes it possible to prevent the batteries to be charged from being overcharged, excessively overheated, and deteriorated by using a non-linear resistance element which turns off at under the voltage equal to the voltage difference between the terminal voltage of the power supply battery and the charging completion voltage of the batteries to be charged. Furthermore, this invention makes it possible to equally charge the batteries to be charged in parallel, and to prevent the reverse charging when in use.

In addition, when the above-mentioned batteries are used outdoors to power an electric-operated toy, they can be repeatedly and easily charged using a power supply battery, for example, a carboard lead-acid battery in conjunction with a non-linear resistance element. In this way, the above-mentioned advantages of this invention can be enjoyed, and Ni-Cd batteries can be more satisfactorily and successfully utilized in electric-powered toys.

Although this invention has been described in connection with its examples, it will be apparent that the invention is not limited specifically thereto but may be modified and varied without departing from the scope of the novel concepts of this invention.

What is claimed is:

1. A battery charging system for charging a Ni-Cd battery having a predetermined number of individual Ni-Cd cells comprising, a lead acid power supply battery having an identical predetermined number of individual lead-acid cells, whose battery terminal voltage is higher than the charging completion voltage of the Ni-Cd battery to be charged, and non-linear resistance elements only connected in series between said power supply battery and the battery to be charged, the total threshold voltage of said elements being approximately equal to the voltage difference between the terminal voltage of the power supply battery and the charging completion voltage of the battery to be charged; wherein the batteries to be charged are charged from the power supply battery via the non-linear resistance element to provide a constant-voltage charge across the batteries without overheating or overcharging.

2. A battery charging system set forth in claim 1, wherein the power supply battery is charged in the floating condition by means of a constant voltage D-C power supply.

3. A battery charging system set forth in claim 1 wherein the non-linear resistance element is at least one semiconductor diode.

4. A battery charging system as in claim 3 and wherein said semiconductor diode is a germanium diode and there is included one germanium diode for each individual cell.

5. A battery charging system as in claim 3 and wherein there is included a silicon diode for each two individual cells.

6. A battery charging system as in claim 1 wherein batteries to be charged are charged only through the non-linear resistance element without the use of a linear resistor.

7. A battery charging system as in claim 1 and further including a plurality of substantially identical Ni-Cd batteries connected in parallel and being charged by said lead-acid power supply battery.

* * * * *